No. 812,836. PATENTED FEB. 20, 1906.
P. H. FARRELL.
DOP.
APPLICATION FILED AUG. 30, 1904.
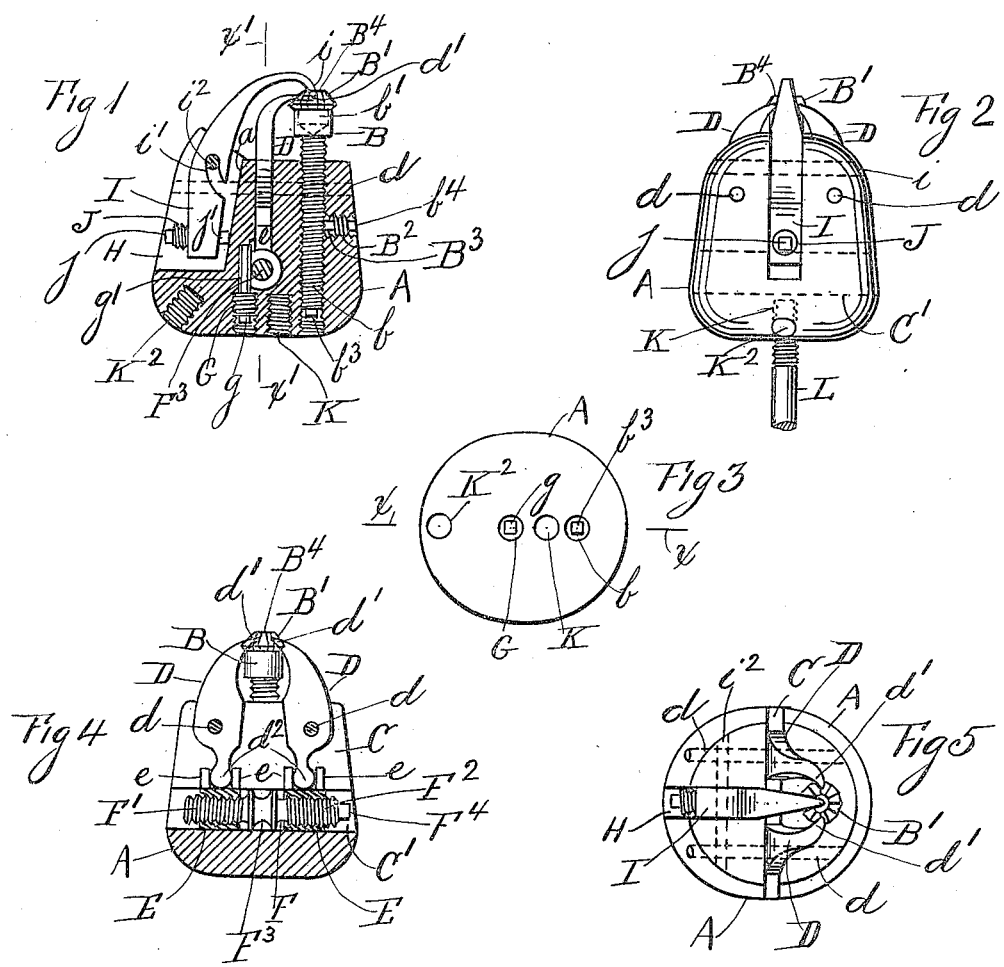
WITNESSES:
O. Otto
Myron H. Cook
INVENTOR
Philip H. Farrell
BY
A. de Bonneville
ATTORNEY

UNITED STATES PATENT OFFICE.

PHILIP H. FARRELL, OF FLUSHING, NEW YORK.

DOP.

No. 812,836.  Specification of Letters Patent.  Patented Feb. 20, 1906.

Application filed August 30, 1904. Serial No. 222,767.

*To all whom it may concern:*

Be it known that I, PHILIP H. FARRELL, a citizen of the United States, and a resident of Flushing, in the county of Queens and State of New York, have invented a certain new and useful Dop, of which the following is a specification.

This invention relates to a dop for holding stones, diamonds, and the like while being ground or polished.

The organization of the invention comprises a dop with a pair of adjustable jaws that coact to hold a stone by bearing on the facets of the same and a third independent jaw that bears on the table of the stone supported on the dop. The body of the dop is characterized by the absence of any projecting portions, so as to provide a uniform smooth dop in the hand of the operator.

In the drawings, Figure 1 represents a partial vertical section of my improved dop as on the line $xx$ of Fig. 3. Fig. 2 shows a side view of Fig. 1. Fig. 3 is a bottom view of the dop. Fig. 4 is a partial section of Fig. 1 on the line $x'x'$. Fig. 5 shows a top view of the dop.

At A is shown the body or holder of the dop, which is threaded for the stem $b$ of the cup-shaped support B. The cup is shown at $b'$ supporting the stone B'. At the lower end of the stem $b$ there is formed a head $b^3$, to which a key or wrench can be applied to adjust the support B in proper position for different sizes of stones. A threaded opening is formed in the side of the dop for a screw $B^2$ with a head $b^4$, and a washer $B^3$, threaded on one of its end faces to fit the threads of the stem $b$, is placed against the said stem and held in place by the screw $B^2$. The washer in bearing against the said stem $b$ holds it in place and prevents it turning.

A slot C is formed in about the central portion of the dop and connects with a cylindrical opening C'. Jaws D are pinned in the slot C by means of the pins $d$, and each jaw terminates in a hook $d'$ at one end and a lug $d^2$ at the other end. Two threaded thimbles E are located in the cylindrical opening C', and prongs $e$ extend from the thimbles, so as to embrace the lugs $d^2$ of the jaws D. The thimbles carry the screw F, having the right and left handed threads $F^2$ $F'$, and a central concaved portion $F^3$ is located between said threads, while a head $F^4$ projects from one of the threaded portions of the said screw. A screw G is screwed into a threaded opening through the bottom of the holder A and has a head $g$ and stem $g'$, which latter fits into the concaved portion $F^3$ of the screw F to hold the latter in place. The stem $g'$ generally projects beyond the portion $F^3$ into the holder A. A second slot H is formed in the dop at right angles to the slot C to hold a third independent removable jaw I, which latter terminates in a bent hooked end $i$, and the jaw has at its opposite end a threaded opening for a screw J with a head $j$ and stem $j'$. The stem $j'$ can bear against a wall $a$ of the dop. The jaw I has a slot $i'$, by means of which it can be adjustably supported on the pin $i^2$, which is supported in the body of the dop.

A threaded opening K in the bottom of the dop is made parallel to the axis of the stem $b$ and is provided for the supporting-stem L, which latter can be screwed therein. A second opening $K^2$, inclined to the opening K, is provided for the same purpose.

To use the dop, the stone to be ground or polished is placed on the support B, and if the table $B^4$ of the stone B' is to be ground or polished the jaw I is removed from the dop, and the jaws D, with their hooked ends $d'$ bearing upon the facets of the stone, are placed in proper position by making the proper adjustment by means of the screw F and the stem $b$. The table will thus be left clear to be acted upon by the polishing wheel or device. When the facets of the stone are to be either ground or polished, the jaw I can be made to hold the stone in place, or the jaws D may be employed, and both the jaw I and the jaws D may be used to operate on the facets of the stone. The hooks $d'$ are made to bear upon the facets not being ground, and so hold the stone in position on the support B.

It will be noted that the jaws D swing on the pins $d$, the hooks $d'$ approaching or receding from each other by the action of the screw F on the thimbles, and that the jaw I swings on the pin $i^2$ and can be easily removed by reason of the slot $i'$.

Having described my invention, I claim—

1. In a dop the combination of an adjustable support for a stone, a pair of jaws pinned in a slot in the dop, a hook extending from one end of each jaw, a lug extending from the opposite end of each jaw, means connected with the lugs to move the jaws and an independent removable jaw in the dop arranged to coact with the other jaws.

2. In a dop the combination of an adjustable support, a pair of jaws pinned in a slot in the dop, a hook end extending from one end of each jaw, a lug extending from the opposite end of each jaw, means connected with the lugs to move the jaws in position, an independent removable jaw having a slot, a pin in the dop supporting the latter jaw by engaging with its slot, a screw passing through one end of the latter jaw, and bearing against a wall of the dop to secure the jaw in place.

3. In a dop the combination of a threaded stem supported in the dop, a cup-shaped support on the end of the stem, a screw in the dop at right angles to said stem, a washer between the end of the screw and the said stem, the end face of the washer threaded to fit the threads of said stem a detachable jaw pinned in the dop, a hooked end extending from the jaw to clamp a stone on the support, a screw in the other end of the jaw and arranged to bear against a wall of the dop to secure the said jaw in place.

4. In a dop the combination of a stem, a cup-shaped support for a stone on the end of the stem, means to secure the stem in position, a pair of jaws pinned in a slot in the dop, a hook extending from one end of each jaw, a lug extending from the opposite end of each jaw, threaded thimbles in a cylindrical opening in the dop, the said opening connecting with the said slot, a screw having a right-handed and a left-handed thread connecting the thimbles, means to turn the screw, prongs extending from each thimble and embracing the lugs of the jaws, a stem in the dop engaging the screw to maintain it in place, an opening in the dop for a supporting-stem parallel to the stem of the support and a second opening for the supporting-stem inclined to the first opening.

Signed at New York, in the county of New York and State of New York, this 26th day of August, A. D. 1904.

PHILIP H. FARRELL.

Witnesses:
MYRON H. COOK,
O. OTTO.